(12) United States Patent
Lembo, III et al.

(10) Patent No.: US 9,162,242 B2
(45) Date of Patent: *Oct. 20, 2015

(54) SPRINKLER ASSEMBLY SYSTEM

(71) Applicants: Carl Lembo, III, Hudson, MA (US); Kristin Lembo, Hudson, MA (US)

(72) Inventors: Carl Lembo, III, Hudson, MA (US); Kristin Lembo, Hudson, MA (US)

( * ) Notice: Subject to any disclaimer, the term of this patent is extended or adjusted under 35 U.S.C. 154(b) by 206 days.

This patent is subject to a terminal disclaimer.

(21) Appl. No.: 13/925,282

(22) Filed: Jun. 24, 2013

(65) Prior Publication Data

US 2014/0042236 A1 Feb. 13, 2014

Related U.S. Application Data

(63) Continuation-in-part of application No. 12/807,618, filed on Sep. 9, 2010, now Pat. No. 8,469,287.

(51) Int. Cl.
*A01G 25/06* (2006.01)
*B05B 12/02* (2006.01)

(52) U.S. Cl.
CPC ............... *B05B 12/02* (2013.01); *A01G 25/06* (2013.01); *Y10T 29/49947* (2015.01)

(58) Field of Classification Search
CPC ...... B05B 15/06; B05B 15/065; B05B 15/10; A01G 25/16; A01G 25/165
USPC ............. 239/67, 69, 70, 200–205, 1, 11, 450, 239/548, 600
See application file for complete search history.

(56) References Cited

U.S. PATENT DOCUMENTS

| | | | | |
|---|---|---|---|---|
| 4,852,802 | A * | 8/1989 | Iggulden et al. | 239/64 |
| 8,469,287 | B1 * | 6/2013 | Lembo et al. | 239/201 |
| 2007/0029401 | A1 * | 2/2007 | Kaen | 239/69 |
| 2011/0111700 | A1 * | 5/2011 | Hackett | 455/41.2 |

* cited by examiner

*Primary Examiner* — Davis Hwu
(74) *Attorney, Agent, or Firm* — Bay State IP, LLC

(57) ABSTRACT

A sprinkler system having a sprinkler assembly with at least one sprinkler head having a removable top coupled thereto by an attachment means. A female inlet removably couples the sprinkler head to a swing joint, which is buried below the sprinkler head and connects the sprinkler head to the irrigation feed. The removable top has a plurality of openings for exporting water from the irrigation feed outwardly therefrom. A top surface of the sprinkler head includes crushed stone for stabilizing the sprinkler assembly. The sprinkler system further includes a control system in electronic communication with a valve and control box connected to the sprinkler assembly.

10 Claims, 5 Drawing Sheets

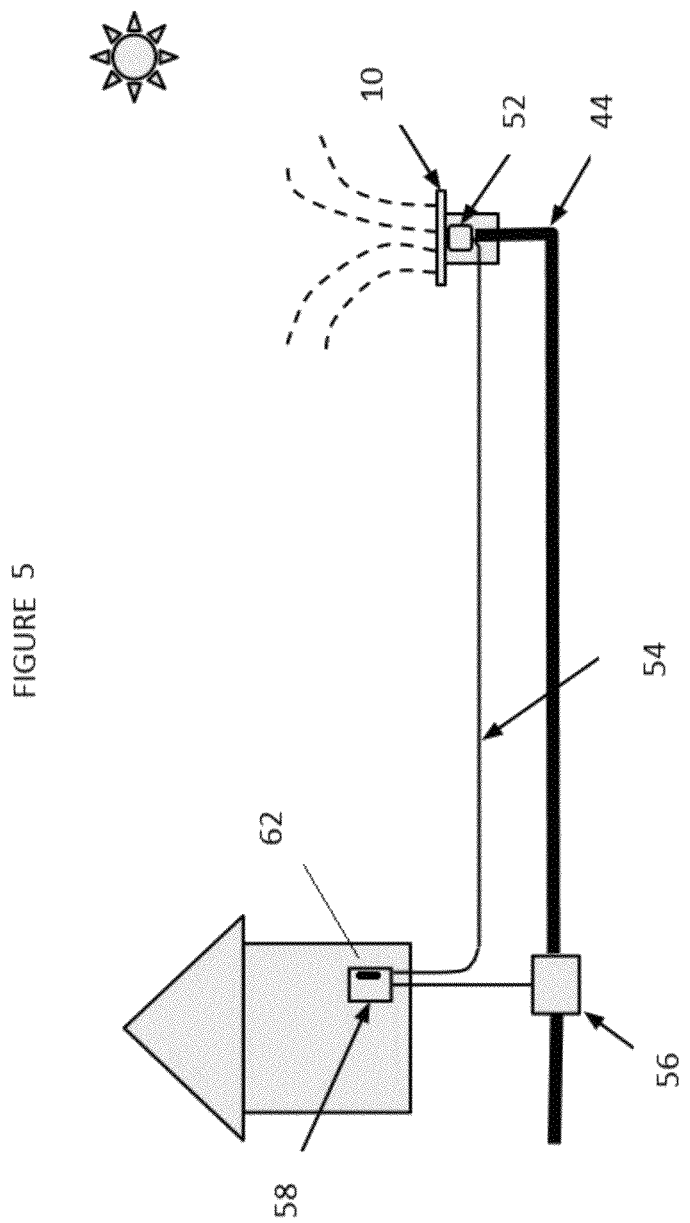

SPRINKLER ASSEMBLY SYSTEM

CROSS-REFERENCE TO RELATED APPLICATION

This application is a continuation-in-part application which claims the benefit of and takes priority from U.S. application Ser. No. 12/807,618 filed on Sep. 9, 2010, and which in turn claims the benefit of Provisional Patent Application Ser. No. 61/276,176 filed on Sep. 9, 2009, the contents of which are hereby incorporated by reference.

BACKGROUND OF THE INVENTION

1. Field of the Invention

The present invention relates to sprinklers, and more particularly, to a sprinkler assembly system which may be incorporated with an existing irrigation system, but is not required. The sprinkler system facilitates a water park atmosphere that is applicable in the backyard, a playground, schoolyard, or in a courtyard and is a great treat for pets as well.

2. Description of the Related Art

Water games are a fun and refreshing way to beat the heat and get exercise. Families travel to commercial water parks to enjoy a variety of water sports and games. Water sports and games have also been manufactured for use in the backyard or park. Families have abandoned the antiquated lawn sprinkler and now use above-ground pools, slip and slides and other lawn based water toys for their summer recreational needs. However, these water devices and sprinklers may pose harm to users and the lawn they occupy.

Unlike other sprinkler systems on the market the present invention is buried flush with the sub grade. No portion of the sprinkler system ever pops up over the grass or plant material, thereby eliminating injury caused by tripping or hitting the device. Such a unique design protects both the user and the sprinkler system from damage. Additionally, the present invention may be electronically controlled through an irrigation timer of an existing irrigation system thereby eliminating the need for long hoses. The absence of a hose protects not only those who interact with the present invention but also protects the grass from damage caused by the hose being left out and burning the lawn.

While these units may be suitable for the particular purpose employed, or for general use, they would not be as suitable for the purposes of the present invention as disclosed hereafter.

SUMMARY OF THE INVENTION

The instant system and method, as illustrated herein, is clearly not anticipated, rendered obvious, or even present in any of the prior art mechanisms, either alone or in any combination thereof. Thus the several embodiments of the instant apparatus are illustrated herein.

It is an object of the invention to enhance the use of existing professional irrigation systems to facilitate a water park atmosphere in a backyard, on a playground, in a courtyard, or elsewhere. Accordingly, the present invention is a sprinkler assembly including at least one sprinkler head and removable top and is adapted for use with existing irrigation systems to provide a water park atmosphere.

It is another object of the invention to provide a system which is easily installed and does not damage the user's lawn. Accordingly, sprinkler assembly of the present invention is adaptable with existing irrigation system eliminating hoses to trip over or cause damaging brown burn lines on the user's lawn.

It is another object of the invention to provide sprinkler assembly that is easily accessible for cleaning the irrigation feed. Accordingly, the removable top of the present invention allows the user convenient access to the sprinkler head and the irrigation feed for easy cleaning.

It is another object of the invention to provide a sprinkler assembly which eliminates tripping caused by an obtrusive sprinkler head extending upwardly from the lawn while children play or adults walk along the lawn. Accordingly, the sprinkler head of the present invention is buried flush within the ground surface of the lawn and does not have to extend upwardly over the grass or plant material when in use, thereby prohibiting tripping over or breaking while in operation.

It is another object of the invention to provide a sprinkler assembly which conserves water and is adaptable with existing irrigation systems. Accordingly, the sprinkler assembly of the present invention is electronically controlled by an irrigation timer, for conserving water and setting a specific time to turn off.

It is yet another object of the invention to build a sprinkler assembly having solid and durable construction that is both gentle on the feet and impervious to the elements such as snow, ice, lawn mowers, thatching, and slice seeding. Accordingly, the sprinkler head and removable top of the present invention are made from durable and sturdy prefabricated plastic which is gentle and withstands natural elements.

It is another object of the invention to provide a sprinkler assembly that is easily winterized and eliminates the need to coil up hoses and bring them in for the winter. Accordingly the sprinkler assembly of the present invention couples with the existing irrigation system in use throughout the year without the need for extra hoses and time consuming clean-up and winterization.

It is another object of the invention to provide a sprinkler assembly that can adjust the water pressure while in use. Accordingly, sprinkler assembly of the present invention can be installed with an adjustable water flow controller integrally coupled within the irrigation system for providing a means for selectively adjusting the water pressure at each sprinkler head as well as the ability to provide increased pressure at selective sprinkler heads or zones in order to provide a true water park "maze of water" effect.

This invention is a sprinkler assembly for use with existing irrigation systems adapted to be an integral component controlled and operated by the system. The sprinkler assembly includes at least one sprinkler head having a removable top coupled thereto by an attachment means. A female inlet removably couples the sprinkler head to a swing joint, which is buried below the sprinkler head and connects the sprinkler head to the irrigation feed. The removable top has a plurality of openings for exporting water from the irrigation feed outwardly therefrom. A top surface of the sprinkler head includes crushed stone for stabilizing the sprinkler assembly. Additional stabilizing means include pointed flanges driven into the ground.

The present invention allows any residence, park, hotel, or commercial location with an irrigation system to be equipped with features similar to a water park. As no hoses are required for the present invention to function, the invention requires no maintenance and provides season after season of enjoyment.

There has thus been outlined, rather broadly, the more important features of a sprinkler assembly system in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways, including applications involving not only firefighters. Also, it is to be understood that the phraseology and terminology employed herein are for the purpose of description and should not be regarded as limiting.

These together with other objects of the invention, along with the various features of novelty, which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

In the drawings, like elements are depicted by like reference numerals. The drawings are briefly described as follows.

FIG. 5 is a diagrammatic perspective view of yet another embodiment of the sprinkler assembly of the present invention in combination with the remote control system.

DETAILED DESCRIPTION OF THE PREFERRED EMBODIMENTS

Figure 1:
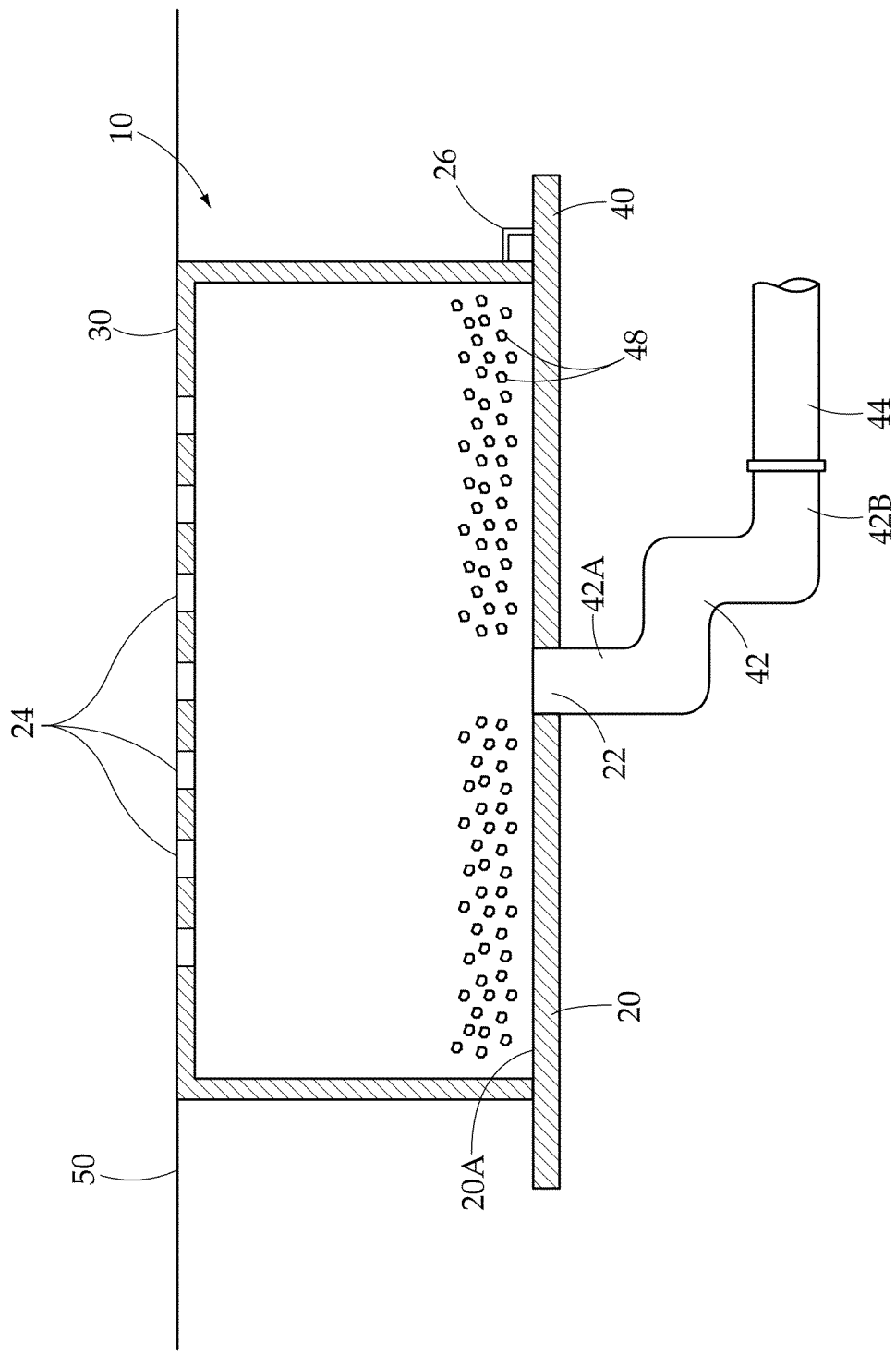
FIG. 1 is a diagrammatic perspective view of a sprinkler assembly of the present invention, illustrating one sprinkler head for use with an existing irrigation system.

FIG. 1 illustrates the sprinkler assembly 10 of the present invention. The sprinkler assembly 10, uniquely winterized, is preferably for use with existing irrigation systems and is adapted to be an integral component controlled and operated by the existing irrigation system; however the present invention may operate and be installed without an existing irrigation system. In its broadest context, the sprinkler assembly 10 includes at least one sprinkler head 20 and a removable top 30.

The sprinkler head 20 and removable top 30 are preferably made of durable solid materials, such as prefabricated plastic or other similar materials which are gentle on the feet and impervious to the elements (including snow, wind, rain, lawn mowing, thatching, and slice seeding). Preferably, the sprinkler head 20 is substantially rectangular and approximately ten inches in length, twelve inches in width, and one inch in height, although alternative dimensions are contemplated. In the preferred embodiment, the removable top 30 is substantially rectangular and approximately eight inches in length, ten inches in width, and four inches in height, although alternative dimensions are contemplated. It is also contemplated that other shapes may be suitable for the removable top. Preferably, the sprinkler head 20 and removable top 30, when in use, are positioned flush with the ground surface 50 so as to prevent tripping or breaking while in operation.

The sprinkler head 20 is removably coupled to a female inlet 22 wherein the female inlet 22 is substantially wide to accommodate a swing-joint 42, preferably three-quarters to one-inch in diameter. The swing joint 42 is utilized to reduce any stress on the fittings as well as flexibility in the setting unity.

In the preferred embodiment, the swing joint 42 connects the sprinkler head 20 to the irrigation feed 44. The swing joint has a first end 42A which couples to the female inlet 22 of the sprinkler head 20 and a second end 42B which couples to the irrigation feed 44.

In an alternative embodiment, the sprinkler head 20 is coupled to the irrigation feed 44 by a flexible hose. The flexible hose has a first end which couples to the female inlet of the sprinkler head and a second end which has an irrigation inlet that is adapted to accept the existing underground irrigation feed. Preferably, the irrigation inlet is three-quarters to one-inch in diameter.

The removable top 30 includes a plurality of openings 24 which export water from the female inlet 22, swing joint 42, and irrigation feed 44 above the ground surface 50 in a plurality of different fashions, directions and patterns, based on the orientation and design of the openings 24. It is contemplated that the openings 24 can be a plurality of shapes and sizes to create ideal water flow through the removable top 30.

The sprinkler head 20 also includes a top surface 20A which couples the sprinkler head to the removable top 30 by an attachment means 26. Preferably, the attachment means 26 is a set of screws, which are easily installed and removed for access to the sprinkler head for servicing and cleaning the unit, as needed.

In an alternate embodiment, it is contemplated that the removable top 30 can include a membrane layer, which extends over each opening and prohibits the openings 24 from clogging during use or in between uses.

In alternate embodiments, the sprinkler head has a rotating disk coupled to the top surface positionable adjacent to the female inlet such that the water flowing from the irrigation feed and swing joint through the female inlet passes through the rotating disk. The rotating disk has extensions, similar to fins or paddles, with a plurality of holes for letting water pass therethrough. The rotating disk provides increased variety and speed in which orientation and design of the water is uniquely exported through the plurality of openings on the removable top.

Figure 2:
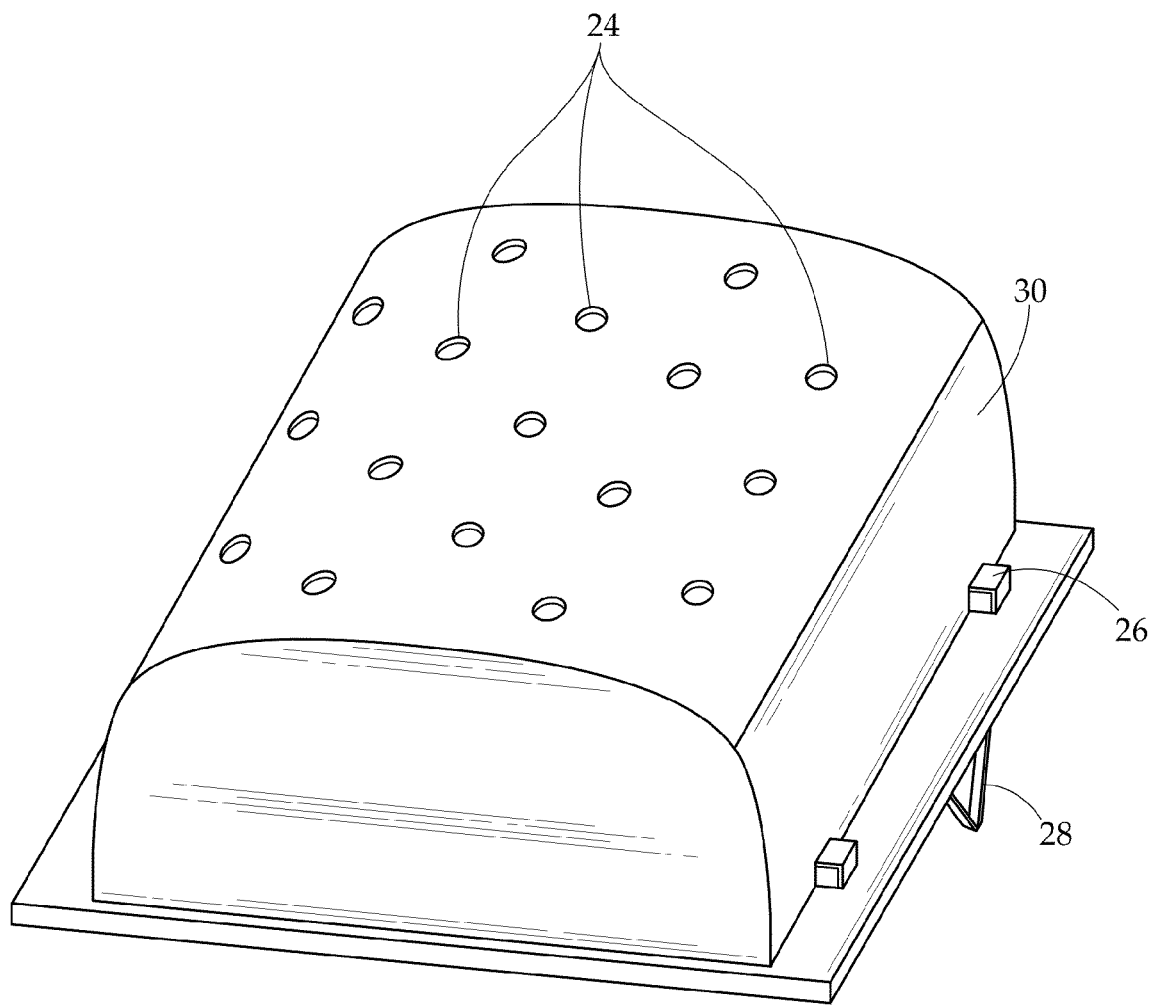
FIG. 2 is a front plan view of a sprinkler assembly of the present invention, illustrating the outer view of the sprinkler head with the removable top attached to the sprinkler head.

The top surface 20A of the sprinkler head 20 includes a base of crushed stone 48 positionable thereon to provide stability to the sprinkler head 20. In an alternative embodiment, the crushed stone 48 is positionable below the sprinkler head 20, and the sprinkler head 20 can rest on top of the crushed stone 48. Additionally, the sprinkler head 20 has stability extensions 40, which are buried in the ground; helping to ensure the sprinkler head remains in a fixed position. In other embodiments, the sprinkler head includes pointed flanges 28 (shown in FIG. 2) which are driven into the ground for increasing stability to the sprinkler assembly 10.

The sprinkler assembly 10 is electronically controlled through an irrigation timer or equivalent and coupled to the existing irrigation feed system. The irrigation timer is one similar to those known in the art and enables the sprinkler assembly 10 the unique ability to conserve water, while still being used as directed. The irrigation timer enables the sprinkler assembly 10 to be actuated and stopped, selectively set to go both on and off by means of the timer under certain preset parameters and conditions. This eliminates the need for water waste and dragging long lawn hoses across the yard to trip over or cause brown burn lines on the user's lawn when the sun beats down.

The sprinkler assembly 10 includes an adjustable water flow controller integrally coupled within the irrigation system for providing a means for selectively adjusting the water pressure at each sprinkler head as well as the ability to provide increased pressure at selective sprinkler heads or zones in order to provide a true water park "maze of water" effect. The water flow controller is similar to those well known in the art and contributes to water conservation.

The sprinkler assembly 10 is not only a solid and durably designed assembly, but it is gentle on feet, as children run and play over it, and is impervious to the elements (snow, ice, mowing, thatching, slice seeding). The sprinkler head 20 is winterized, and available in a plurality of different colors including grass green, mulch brown, pavement black, for camouflaging with the surroundings.

Figure 3:
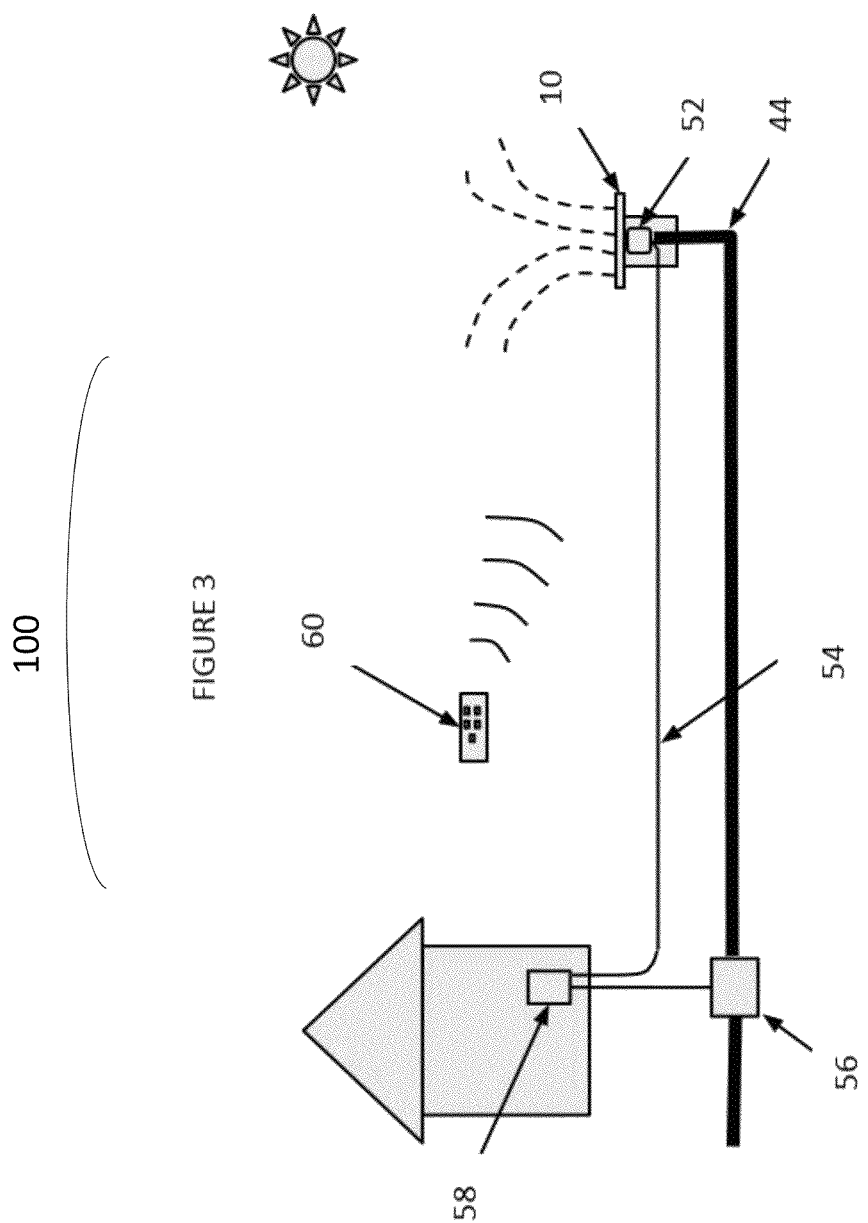
FIG. 3 is a diagrammatic perspective view of one embodiment of the sprinkler assembly of the present invention in combination with a remote control system.

FIG. 3 illustrates one embodiment of the instant invention, wherein the sprinkler assembly 10 is incorporated into a sprinkler system 100 further comprising a control system 58 to allow an individual operator of the sprinkler system 100 to manipulate the operation of the sprinkler assembly 10 (i.e. to control the frequency, duration and length of time the sprinkler system 10 is in use). The control system 58 is preferably in electronic communication with an integrated valve and control box 52; in one embodiment the control system 58 is in electronic communication with the valve and control box 52 via a pair of voltage direct current wires 54. Preferably, the valve and control box 52 is connected to the sprinkler assembly 10. Additionally, the sprinkler assembly 10 preferably receives a quantity of water during operation through a main water feed 44 which is connected to the integrated valve and control box 52, and further regulated by a main valve box 56. In one embodiment, the main valve box 56 is controlled and receives power from the control system 58.

The control system 58 will preferably include a programmable microprocessor as known in the industry and a power regulator to ensure that the control system 58 operates preferably at twelve volts and half an amp. Furthermore, the control system 58 may include a plurality of individually activated water features and an automatic shut-off. Additionally, the interface of the control system 58 will have an on/off feature and will have a mode selection and speed selection.

The main valve box 56 of the sprinkler system 100 will reside an area less than ten inches in diameter and less than six inches in depth and will utilize COTS components.

The main valve box 56 may require six to twelve VDC operating voltage supplied by the control system 58 and include a plurality of valves. The main valve box 56 is disposed to regulate the water pressure to approximately ninety pounds per square inch and preferably connects to the main water feed 44. In one embodiment, the main valve box 56 will have an input and output manifold; the input manifold will be the interface between the valve system 56 and the output manifold and will a plurality of ports.

The valve and control box 52 will provide a support structure for the valve and controller system. The valve and control box 52 will have an interface to the input manifold and will have access ports to the control system 58 as a power source via the two twelve VDC wires 54. The valve and control box 52 will also have access ports to a water source via the main water feed 44 which connects to the main valve box 56.

The sprinkler system 10 may activate designated zones (i.e. locations on a lawn or similar environment) by a user making a selection on the control system 58 for a designated period of time. In use, when a quantity of power is applied through the two wires 54, the control system 58 may be activated by the user through the use of a radio frequency (RF) remote control 60. The RF remote control 60 is preferably used to activate or configure the sprinkler system 100 by setting the speed, duration and different modes of action. Additionally, the sprinkler system 100 may be shutdown via the control system 58, completion of a timed event or via the RF remote control 60.

Figure 4:
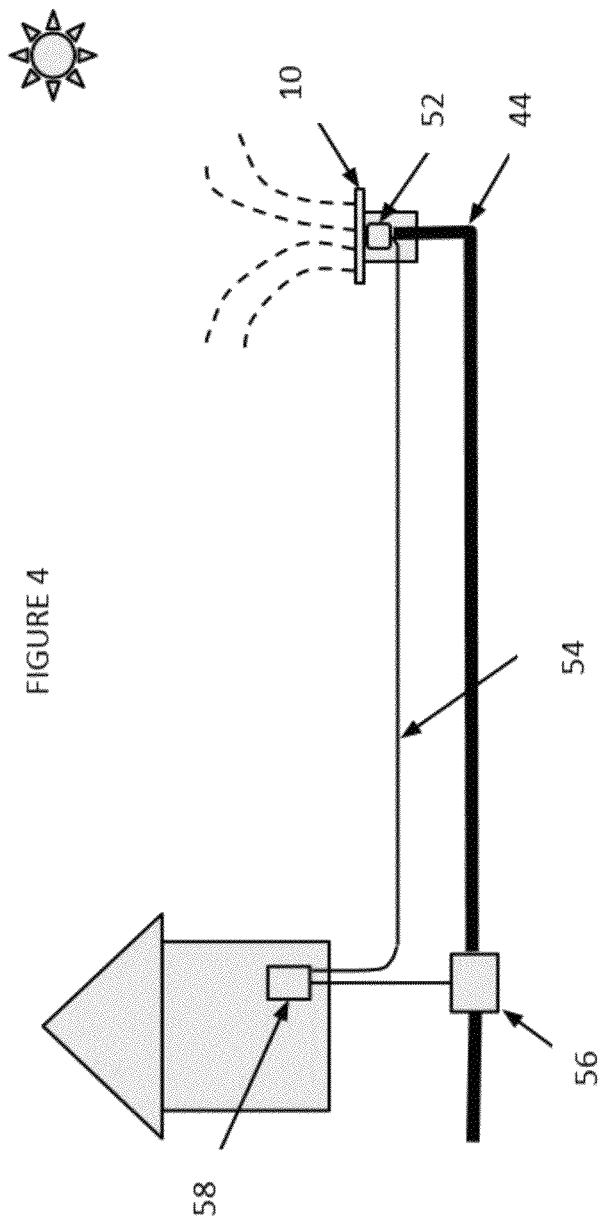
FIG. 4 is a diagrammatic perspective view of another embodiment of the sprinkler assembly of the present invention in combination with the remote control system.

FIG. 4 illustrates another embodiment of the sprinkler system 100, where the user may activate designated zones for the sprinkler assembly 10 to operate through the control system 58 for a designated period of time. When the power is applied through the two wires 54, the control system 58 automatically activates and runs through the preset actions. In this embodiment, all operational control of the sprinkler system 100 is through the control system and does not require the use of the RF remote control 60.

FIG. 5 illustrates another embodiment of the sprinkler system 100, wherein the user may activate designated zones on the control system 58 for a designated period of time. A custom module 62 may be used for each control system 58 with switch interface to activate the sprinkler system 100; the sprinkler assembly 10 The LSZ system may be shutdown via the control system 58 or by the completion of the time event.

In conclusion, herein is presented a sprinkler system having a sprinkler assembly 10 and a control system 58 preferably for connection within an existing irrigation system. The invention is illustrated by example in the drawing figures, and throughout the written description. It should be understood that numerous variations are possible, while adhering to the inventive concept. Such variations are contemplated as being a part of the present invention.

What is claimed is:

1. A sprinkler system comprising:
    a sprinkler assembly, wherein the sprinkler assembly further comprises:
        at least one sprinkler head including a female inlet, a top surface having an attachment means, and at least one stability extension extending downwardly therefrom, wherein the stability extensions are pointed flanges;
        an irrigation feed system for supplying water to said sprinkler head, further comprising an irrigation timer coupled to the irrigation feed system;
        a hose for coupling the sprinkler head to the irrigation feed system;
        a swing joint coupling together said sprinkler head with said irrigation feed system, said swing joint having a first end and a second end, wherein said first end couples to said female inlet of said sprinkler head and said second end couples to said irrigation feed system;
        a removable top coupled to said sprinkler head, said removable top having an opposing attachment means coupled to said attachment means of said top surface of said sprinkler head, said removable top having a plurality of openings;
    a valve and control box, wherein the valve and control box is connected to the sprinkler assembly;
    a control system, wherein the control system is in electronic communication with the valve and control box.

2. The sprinkler system of claim 1, wherein the system further comprises a main valve box is controlled by the control system to regulate a quantity of water through the sprinkler assembly.

3. The sprinkler system of claim 1, wherein the control system is in electronic communication with the valve and control system via a pair of voltage direct current wires.

4. The sprinkler system of claim 1, wherein the sprinkler assembly receives a quantity of water during operation through a main water feed connected to the valve and control box.

5. The sprinkler system of claim 2, wherein the main valve box regulates the water pressure to approximately ninety pounds per square inch.

6. The sprinkler system of claim 1, wherein the control system is activated a radio frequency remote control.

7. The sprinkler system of claim 1, wherein the sprinkler system is shutdown via the completion of a timed event.

8. The sprinkler system of claim 1, wherein the control system further comprises a custom module with a switch interface to activate the sprinkler system.

9. A method of providing a safe, water park themed sprinkler adaptable to an existing irrigation feed system using the sprinkler system of claim 1, comprising the steps of:
    installing said sprinkler head by coupling the second end of the spring joint to the existing irrigation feed system and the first end to the female inlet of said sprinkler head;
    securing said sprinkler head by planting at least one pointed flange into the surrounding ground surface and placing crushed stone along the top surface of said sprinkler head;
    placing the removable top onto said sprinkler head such that said removable top is flushed with the ground surface while in use; and
    securing said removable top to said sprinkler head by aligning the hole of the top surface of the sprinkler head with the opposing holes of the removable top and fastening the screws.

10. The method of providing a safe, water park themed sprinkler adaptable to an existing irrigation feed system using the sprinkler system of claim 9, further comprising the steps of:
    turning off the water flow automatically at the sprinkler head and removable top via the irrigation timer; and
    preventing risk of injury to users by allowing said sprinkler assembly to remain flushed with the ground surface while not in use.

* * * * *